Nov. 3, 1931.  A. BOUSFIELD  1,829,782
FULL CAPACITY TYPE RECORDING BEAM
Filed Jan. 22, 1930  7 Sheets-Sheet 2

INVENTOR
Alfred Bousfield
BY
ATTORNEY

Nov. 3, 1931.　　　A. BOUSFIELD　　　1,829,782

FULL CAPACITY TYPE RECORDING BEAM

Filed Jan. 22, 1930　　　7 Sheets-Sheet 3

Fig.3.

INVENTOR
Alfred Bousfield
BY
ATTORNEY

Nov. 3, 1931.  A. BOUSFIELD  1,829,782

ULL CAPACITY TYPE RECORDING BEAM

Filed Jan. 22, 1930  7 Sheets-Sheet 4

INVENTOR
Alfred Bousfield
BY
ATTORNEY

Nov. 3, 1931.  A. BOUSFIELD  1,829,782

FULL CAPACITY TYPE RECORDING BEAM

Filed Jan. 22, 1930  7 Sheets-Sheet 5

INVENTOR
Alfred Bousfield
BY
ATTORNEY

Nov. 3, 1931.  A. BOUSFIELD  1,829,782
FULL CAPACITY TYPE RECORDING BEAM
Filed Jan. 22, 1930  7 Sheets-Sheet 6

Fig. 6.

INVENTOR
Alfred Bousfield
BY
Franklin S. Frisbee
ATTORNEY

Patented Nov. 3, 1931

1,829,782

UNITED STATES PATENT OFFICE

ALFRED BOUSFIELD, OF ST. JOHNSBURY, VERMONT, ASSIGNOR TO E. AND T. FAIR-
BANKS AND COMPANY, OF ST. JOHNSBURY, VERMONT, A CORPORATION OF VERMONT

FULL CAPACITY TYPE RECORDING BEAM

Application filed January 22, 1930. Serial No. 422,555.

This invention relates to improvements in full capacity type recording beams, more particularly to weighing mechanism for hopper scales and other scales for weighing heavy loads with great accuracy, wherein simple and compact means is employed for determining, indicating and recording by a single impression the total weight of the load.

It has been the general practice in constructing recording beams, when auxiliary or supplemental poises are used in the weighing mechanism, to employ auxiliary poises that are relatively long as compared with the casing of the main poise in which they are usually mounted, thereby rendering it necessary to extend them outside the casing and thus exposed to dust and moisture, while the indicators employed therewith, either disc or linear, have been generally comparatively large or cumbersome. Moreover, in recording the weight of a load, loose counterpoise weights have been employed with recording means both for the counterpoise weights and the beam, thus requiring two impressions in order to procure the record of the total weight of the load. It is the purpose of the present invention to greatly simplify the mechanism required to perform the necessary functions and especially to eliminate entirely the necessity of using loose counterpoise weights and making two impressions to obtain a record of the total weight of the load and to provide campact and efficient auxiliary poises adapted to operate entirely within the casing, as well as indicating dials automatically operated and so disposed and correlated as to consolidate the indicating mechanism in very compact form and to provide for the full weighing capacity of the scale without the use of large or cumbersome mechanism.

Therefore, an important object of the invention is to provide the main poise of the scale, which registers with graduations on the beam in units indicating thousands, with two adjustable auxiliary poises, graduated to register in units of hundreds and fractions thereof respectively. The auxiliary poises are adapted to cause to rotate in synchronism therewith indicating dials mounted in a readily visible position on the main poise, whereby the weight of the load within the range of hundreds of pounds and fractions thereof will be automatically indicated on the dials.

Another object of the invention is to mount the indicating dials concentrically and in superimposed position on the front plate of the main poise so that the hundreds numerals and the fractional numerals will be disposed and maintained in closely correlated and readily readable positions with respect to each other.

A further object is to slidably mount the main poise on the beam and to suspend it from the beam by means of spaced rollers so constructed and disposed as to minimize friction and to provide three-point suspension, whereby the poise will be maintained on the beam in accurate alignment therewith along its entire length and the weight of the poise will be evenly distributed on the beam under varying conditions of service, thus permitting the main poise to constantly slide freely and easily along the beam.

Another object of the invention is to provide adjustable means for readily releasing and holding the main poise in operative engagement with the notches on the lower edge of the beam at the thousands graduations thereon.

Another object of the invention is to provide means for moving the auxiliary poises into operative position, the movement of which is controlled by concentrically disposed knobs mounted on the front of the main poise, whereby the auxiliary poises may be readily moved and adjusted to the desired position.

Another object of the invention is to provide the beam on its lower edge with type numerals denoting thousands, which register in relative position with graduations on the beam, and to also provide the auxiliary poises with type numerals denoting hundreds and fractions thereof respectively, together with means adapted, when the load is balanced by the proper adjustment of the main and auxiliary poises, to bring successively the type numerals of the main beam and auxiliary poises into registering and operative positions with suitable mechanism for impressing and recording on a ticket by a single impression the total weight of the load on a ticket.

A further object of the invention is to so assemble and dispose the auxiliary poises within the casing of the main poise that they will operate entirely within the casing, and thus obviate the necessity of employing poises that extend outside the casing, as well as effectively protecting the poises from dust and moisture and thereby preserving their efficiency.

A further object is to provide means within the main poise adapted to hold and group in co-operative relation the first and second auxiliary poises and their co-operating parts.

A further object of the invention is to provide transversely disposed brushes mounted in the main poise casing above the beam and adapted to engage the upper edge of the beam and to move with the poise as it is moved along the beam, thus keeping the upper edge of the beam clean and free from dust, together with dust guards on each end of the casing, and a hinged dust guard covering the ticket slot in the front plate of the main poise. These provisions for effectively protecting the interior of the main poise and its mechanism from dust are important, especially in scales used for weighing grain and other materials where dust is prevalent.

In order that the nature of my invention may be fully understood, I have illustrated certain embodiments of the invention in the accompanying drawings, in which,—

Figure 1:
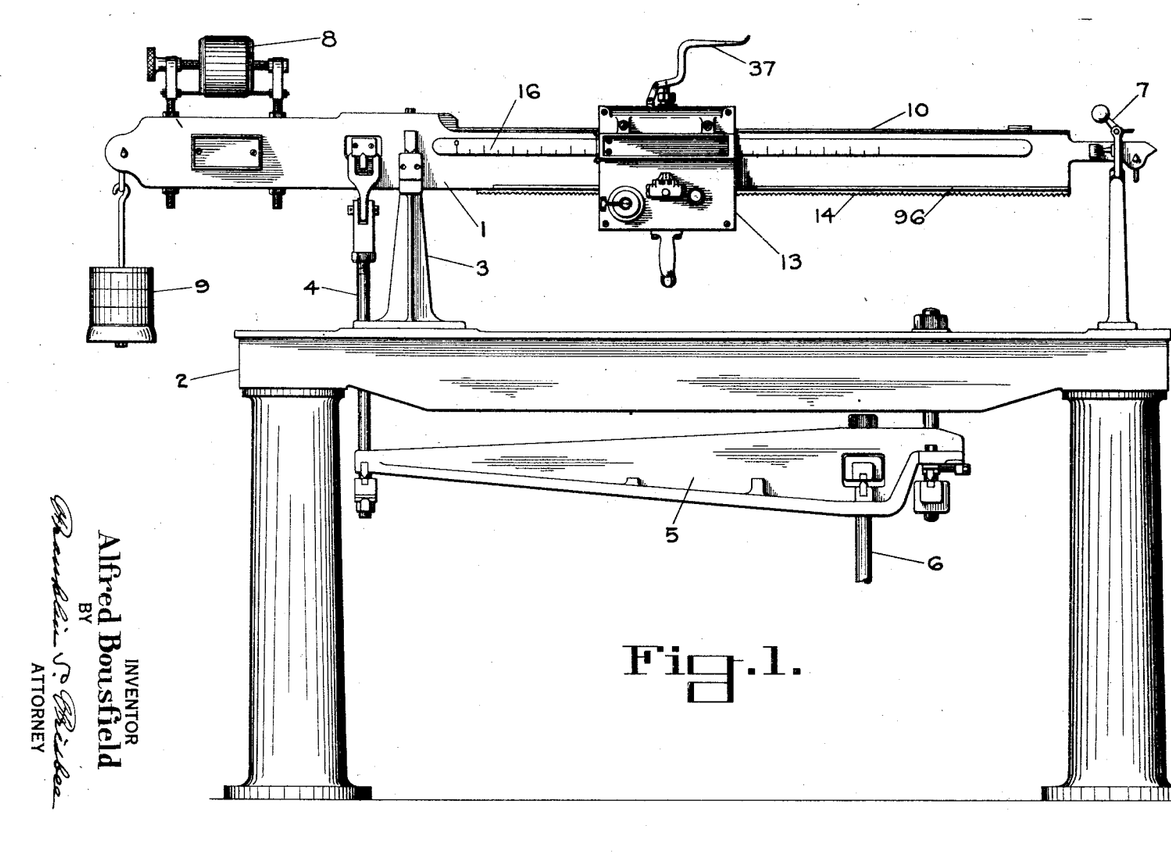
Figure 1 is a longitudinal, front elevation of a portion of a scale with my improved beam and main poise in operative position thereon, embodying a preferred form of my invention.

In the drawings 1 designates the weight beam of a scale 2 pivotally mounted in the standard 3 and connected through the beam rod 4, shelf or multiplying lever 5 and steelyard rod 6 to the weighing levers of the scale mechanism. The beam is also provided with a trig 7, a balancing ball 8 and counterweights 9 for balancing the beam. The upper edge of the beam is formed into a longitudinal rail 10 having longitudinal grooves forming tracks or runways 11, and provided with beveled sides 12 over which the main poise 13, slidably mounted thereon, is adapted to freely move, while the lower edge has inserted therein a toothed rack 14 provided with notches 15, spaced to indicate one thousand pounds each and registering with similar graduations on a longitudinal scale plate 16 inserted in the face of the beam.

Figure 3:
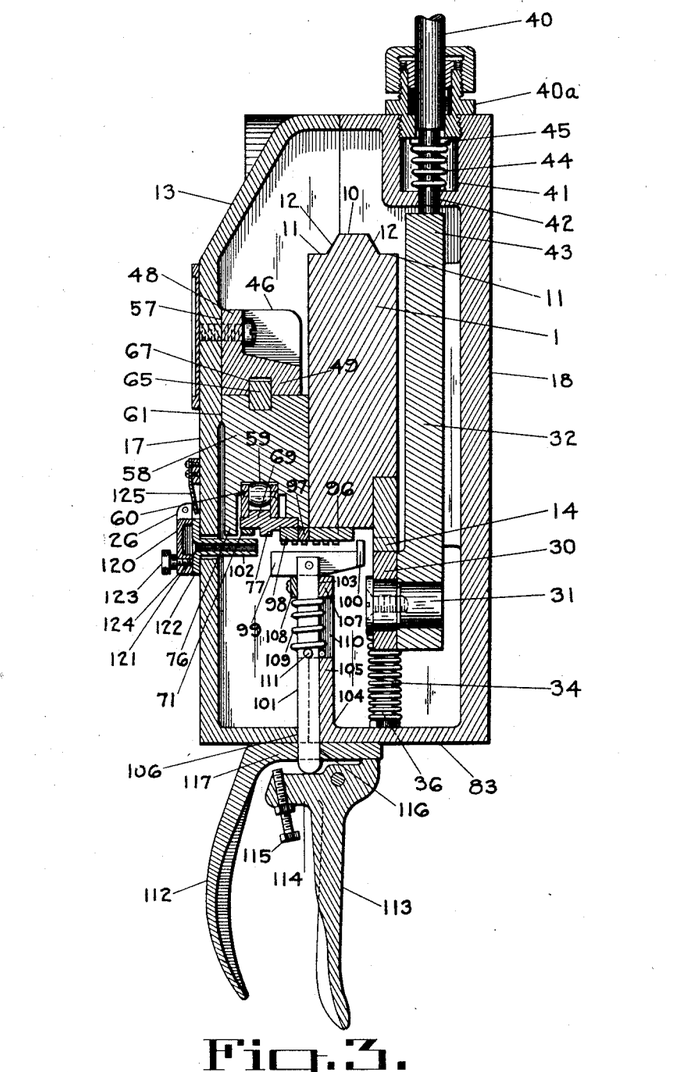
Figure 3 is a center cross section of the main poise and beam on the line 3—3 of Fig. 2, showing particularly the co-operative relation of the first and second auxiliary poises with each other and the beam, together with the multiple-toothed pawl, the grouped type numerals and the printing mechanism.

The main poise 13 is of box-like construction, comprised of two sections, a front section 17 and a back section 18, fastened together by bolts and forming the casing of the main poise 13, which is provided with transversely disposed rollers 19 and 20 for movably suspending the main poise from the beam, the rollers 19 and 20 being journaled in ball bearings 21 and 22 mounted near each end and within the upper portions of the front section 17 and back section 18 respectively of the main poise 13.

Figures 2, 7, 8:
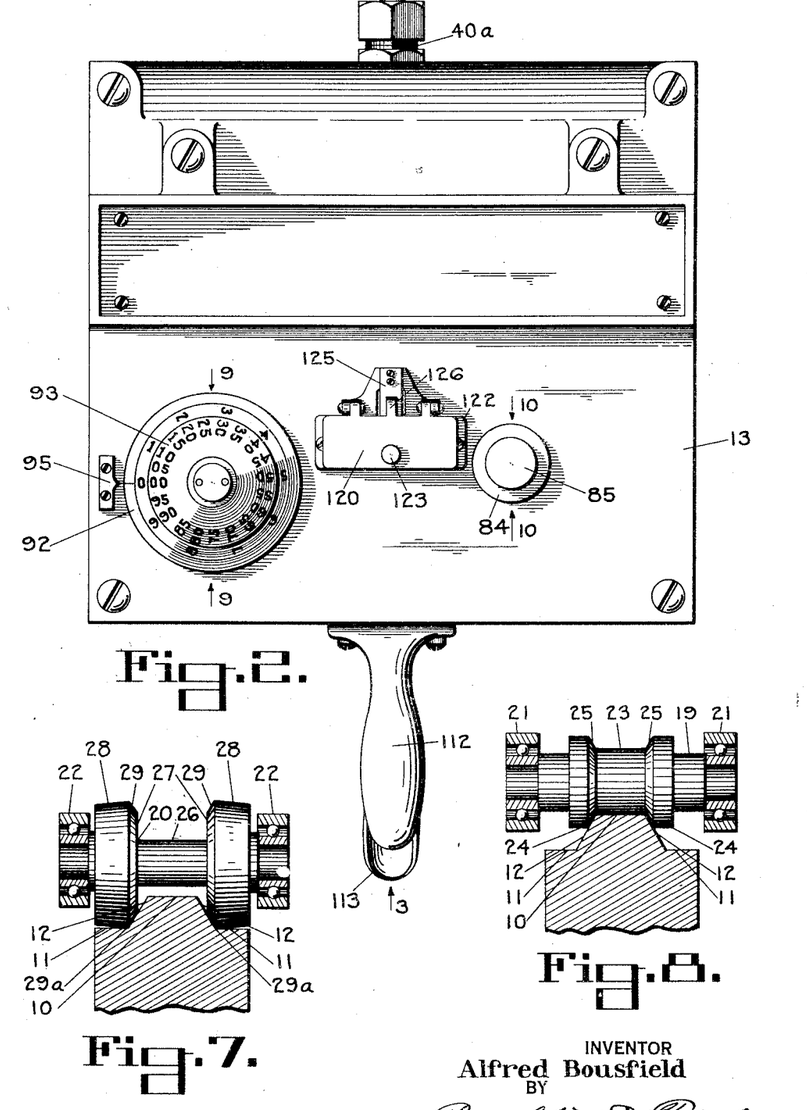
Figure 2 is a front elevation of the main poise showing the concentrically disposed control knobs, of the auxiliary poises and fractional weight indicating dials, together with the ticket slot dust guard.
Figure 7 is a longitudinal view, partly in section, of the large roller, showing the co-operating parts and its traveling position on the beam.
Figure 8 is a similar longitudinal view, partly in section, of the small roller, showing its position as it travels on the beam.

The smaller roller 19 is provided with a center hub 23 and spaced roll portions or rolls 24, the inner edges 25 of which are beveled, the hub 23 being adapted to travel on the top of the longitudinal rail 10, the beveled edges 25 of the rolls 24 being in contact with the beveled sides 12 of the rail 10. The larger roller 20 consists of a center shaft 26 having relatively large, spaced roll portions or rolls 27, the peripheries of which may have a flat portion engaging the track 11, but they are preferably V-shaped having an outwardly beveled portion 28 and an inwardly beveled portion 29 converging at the junction 29a of the track 11 and the beveled side 12, the outwardly beveled portion 28 traveling in contact at the converging point with the track 11 and the inwardly beveled portion 29 traveling in engagement with the beveled side 12 of the rail, while the shaft 26 travels clear of the rail 10. By this construction frictional engagement with the rail 10 and tracks 11 is minimized and the sliding of the main poise 13 along the beam is thereby greatly facilitated.

Moreover, the smaller roller 19 by contacting as previously described on the rail 10 and beveled sides 12 and the two spaced rolls 27 of the larger roller 20 by engaging the tracks 11 at the aforementioned converging point 29a as well as the beveled sides 12 of the rail, constitute a three-point suspension of the main poise 13, by which means the poise is effectively maintained in accurate alignment along the entire length of the beam as well as preventing lateral play as the poise is moved along the beam. This particular means also provides constant and even distribution of the weight of the main poise 13 on the beam notwithstanding any unevenness in the rail 10, tracks 11 or rollers 19 and 20 due to wear in service or other causes. Therefore, by this means the main poise permitted to slide freely and easily along the beam under varying conditions of wear and use.

Figures 5, 11, 12:
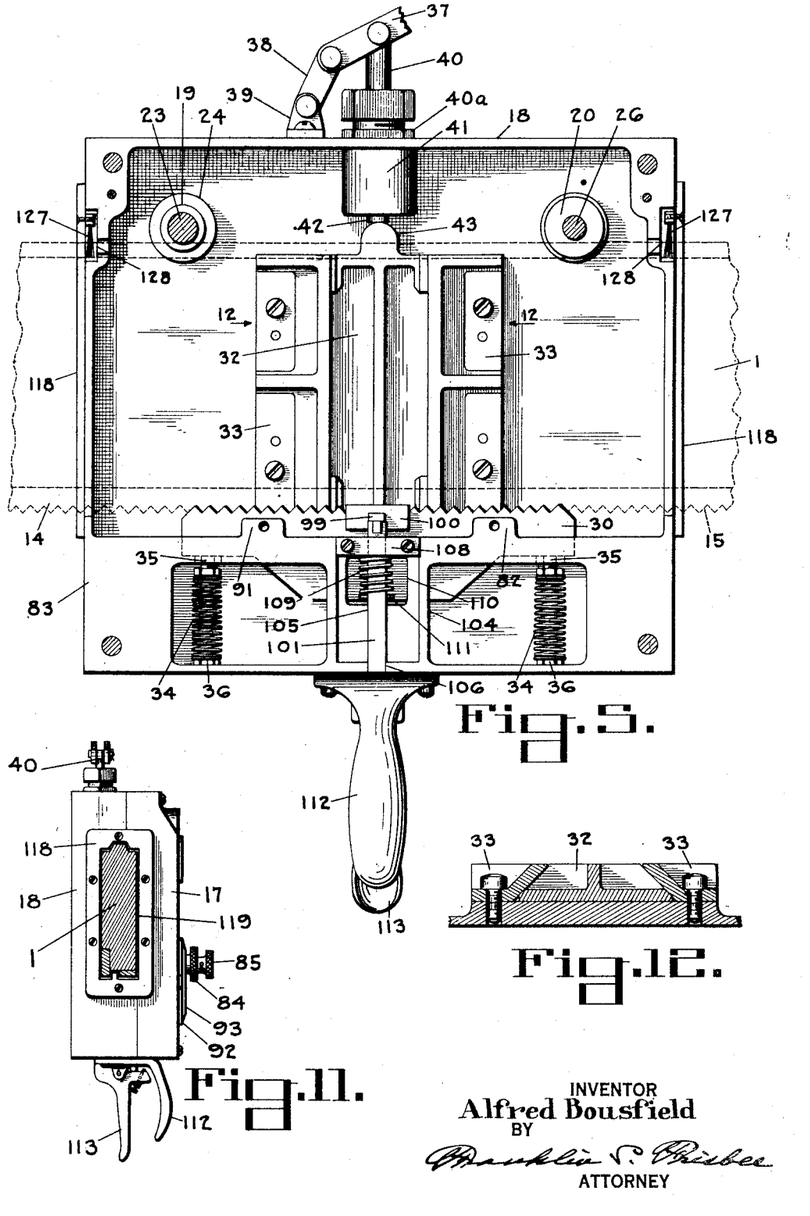
Figure 5 is an inside longitudinal view, partly in section, of the back section of the main poise, showing especially the multiple-toothed pawl and its co-operative engagement with the beam, together with the sliding guide plate connected to the pawl and its operative mechanism.
Figure 11 is an end elevation of the main poise and beam in section, showing especially the dust guard and its operative position on the main poise with relation to the beam.
Figure 12 is cross section on the line 12—12, of Fig. 5, showing the guide plate and co-operating guide ways.

For the purpose of providing accurate and quickly adjustable means for aligning the main poise 13 in registering position with relation to the graduations on the scale plate 16 as well as in positive engagement with the toothed rack 14 on the lower edge of the beam, a multiple-toothed plate or pawl 30 is positioned in the casing below the beam and extends longitudinally along the edge of the beam, its upwardly extending teeth corresponding to and interfitting with the teeth on the toothed rack 14 on the edge of the beam. The pawl 30 is pivotally connected by a pin 31 to a guide plate 32 slidably mounted in guideways or gibs 33 attached to the inner side of the back section 18, while the pawl 30 is normally pressed against and held by spiral springs 34 in co-operative engagement with the toothed rack 14 on the beam. The springs 34 are mounted on depending bosses 35 on opposite ends of the pawl 30 and bosses 36 on the base of the back section 18, the bosses 35 being adjustable, so as to provide means for regulating the tension of the springs 34 and thus equalizing the pressure of the pawl 30 along its entire length in its operative engagement with the teeth 14 on the edge of the beam.

In order to move the pawl 30 out of positive engagement with the beam means is mounted in the upper part of the back section 18 comprising a handle 37 pivotally connected by a link 38 to a bracket 39 secured to the top plate of the back section 18 and to a vertical rod 40 extending through a packing chamber 40a, and a chamber 41 formed integral with the top of the back section 18, the lower end 42 of the rod 40 engaging the upper extended end 43 of the guide plate 32. The rod 40 is normally held in operative contact with the upper end 43 of the guide plate 32, while the handle 37 is held in its raised or inoperative position by an expanded spiral spring 44 surrounding the rod 40 and positioned within the chamber 41, which is adapted to engage a transversely disposed pin 45 in the rod 40 and thus normally hold the rod 40 and consequently the handle 37 in their raised positions, by which means the handle 37 is also returned after operation to its raised position.

Figure 6:
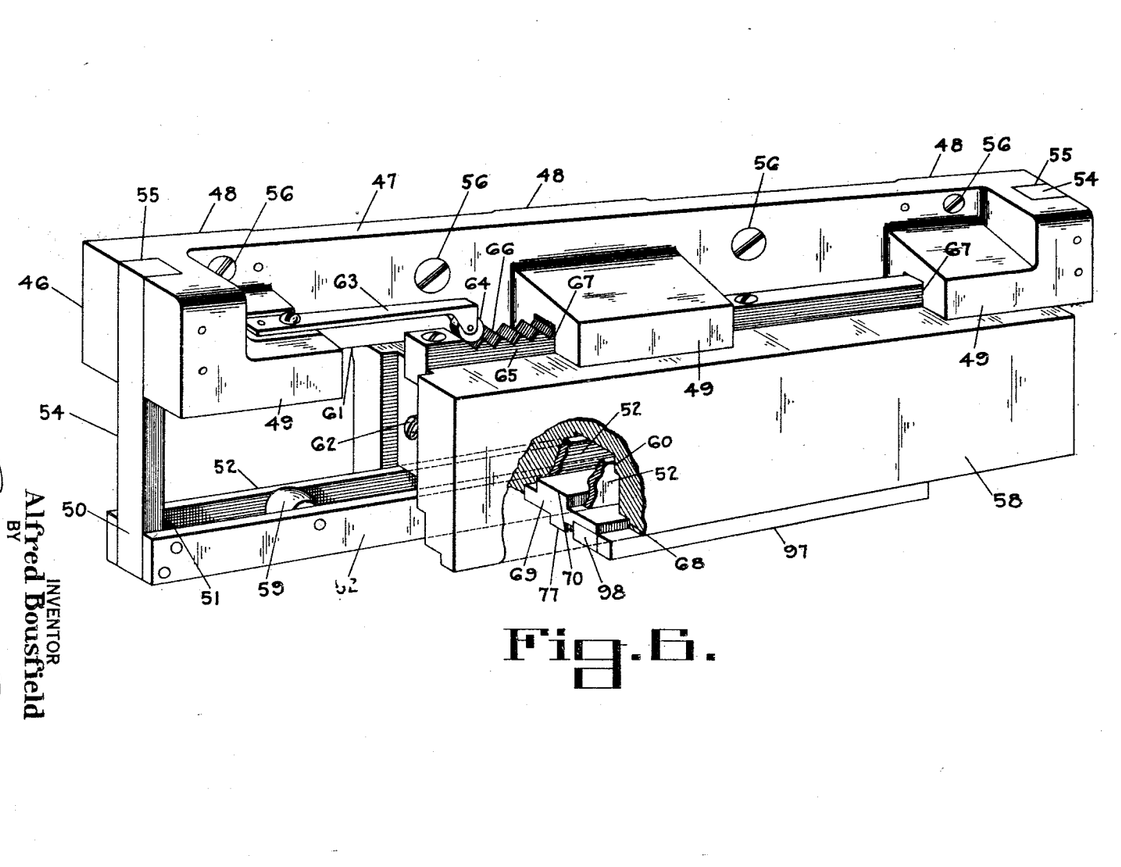
Figure 6 is an isometric view, partly in section, of the bracket and bridge with the first and second auxiliary poises mounted thereon, showing particularly their co-operative relation to each other.

Extending longitudinally within the casing of the main poise is a bracket 46 provided with a main portion 47 having on one side spaced laterally extending inner boss portions 48 and on the other side similarly spaced, elongated outer boss portions 49 located at the center and each end of the bracket 46. Mounted in the bracket 46 is a longitudinal frame or bridge 50 comprising a rail portion 51 formed of spaced rails 52 fastened at the center to a spacer 53 and provided with upwardly extending arms 54, to the lower ends of which the rails 52 are fastened, while the upper ends are inserted and fastened in vertical recesses 55 in the ends of the bracket 46.

Figure 4:
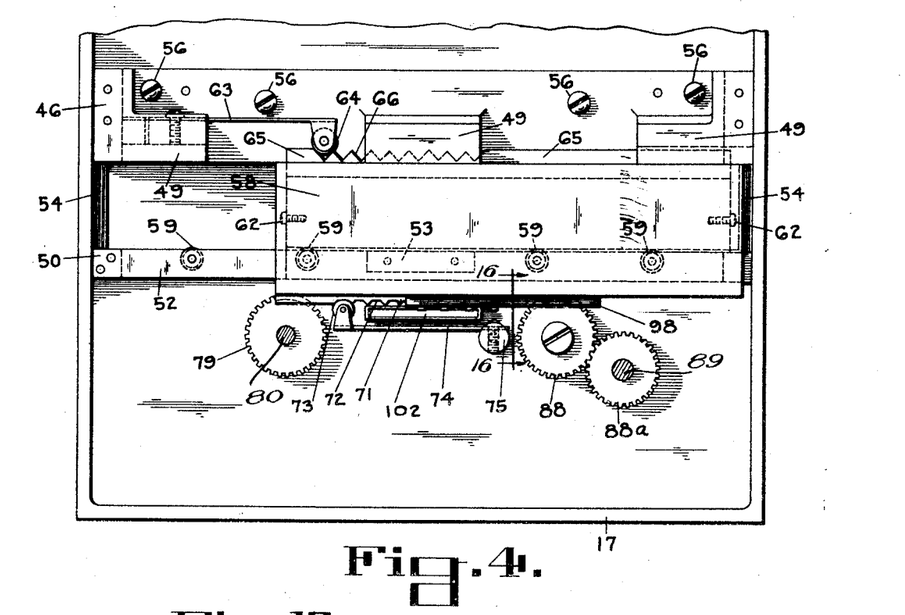
Figure 4 is an inside, longitudinal view, partly in section, of the front section of the main poise, showing particularly the bracket carrying the first and second auxiliary poises and the bridge on which they travel.

The bracket 46 is disposed and fastened in position in the front section 17 of the casing by bolts 56, the inner boss portions 48 engaging and co-operating with similar boss portions 57 on the inner side of the front section 17, by which arrangement the parts co-operating with the bracket 46 are brought into proper operative position within the main poise to perform their functions.

Figure 13:
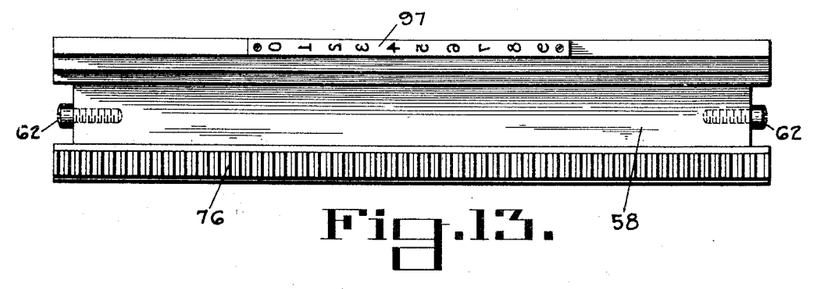
Figure 13 is a plan of the under side of the first auxiliary poise, showing the end adjusting screws for regulating the limit of travel of the first auxiliary poise, together with the toothed rack and type bar.

Mounted in the bracket 46 is the first auxiliary poise 58, which is positioned on the spaced rails 52, over which it is adapted to freely slide on rounded rollers 59 mounted between the rails 52 forming a guideway and being provided with a longitudinal groove 60 on its under side, in which the rails 52 are adapted to freely fit. For the purpose of facilitating the movement of the auxiliary poise 58 and reducing friction the greater portion of the inner side is recessed, leaving a longitudinal contacting portion 61 at its upper edge, where the auxiliary poise 58 contacts with a similar longitudinal raised portion on the front section 17. Adjusting screws 62 are located in the ends of the auxiliary poise 58 for regulating the length of travel of the auxiliary poise 58 and for properly adjusting its position in sealing the scale. Attached to the boss portion 49 at one end of the bracket 46 is a flat elongated spring 63 carrying on its free end a roller 64, which engages a toothed rack 65 secured to the upper edge of the auxiliary poise 58, the roller 64 being adapted to engage the notches 66 between the teeth of the rack 65 in order to lock the auxiliary poise 58 in its proper adjusted balancing position for registering the weight of the load in units of hundreds of pounds from 100 to 900 pounds, each notch 66 denoting 100 pounds. The toothed rack 65 slides freely in grooves 67 in the under side of the elongated boss portions 49 as the auxiliary poise 58 is moved along the rails 52 of the bridge 50.

Figure 14:
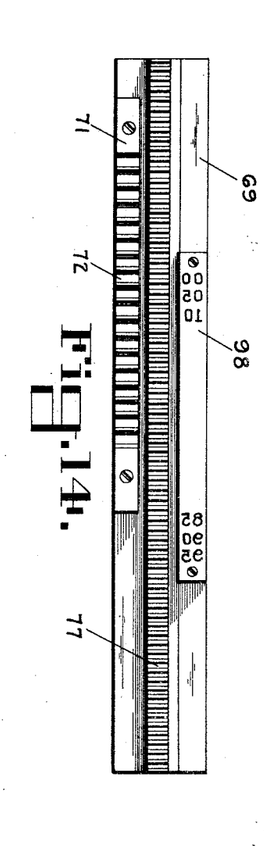
Figure 14 is a plan of the under side of the second auxiliary poise, showing the toothed rack for moving the second auxiliary poise and the toothed rack for locking it in its balancing position, together with the type bar.

Positioned under the first auxiliary poise 58 and fitting in a longitudinal groove 68 in its lower side is the second auxiliary poise 69, which is provided on its upper side with a longitudinal raised portion or rail 70 adapted to fit in the guideway formed by the spaced rails 52, the second auxiliary poise 69 being thus adapted to slide readily in the groove 68 and guideway 52 as it is being moved to its proper position. In order to accurately adjust the second auxiliary poise 69 it is provided with a toothed rack 71 on its under side, the notches 72 of which are engaged by a roller 73 mounted on a flat spring 74, which is fastened to a stud 75 in the front section 17 of the casing. The roller 73 thus engaging the notches 72 of the toothed rack 71 locks the second auxiliary poise in its balancing position for registering the weight of the load in units of 5 pounds to 95 pounds, each notch indicating 5 pounds, thereby providing very accurate means for weighing heavy loads.

It will be noted that the auxiliary poises 58 and 69 are so constructed and disposed that their limits of travel permit them to readily operate entirely within the casing. Further, it will be noted that a decided advantage in constructing the main poise is derived by employing the bracket 46 and bridge 50 as an assembling unit, on which to group in co-operative relation both the first and second auxiliary poises 56 and 69 together with their co-operating parts. By this arrangement the whole unit may be readily assembled in the casing by simply securing it by the bolts 56 to the front section 17.

Figures 9, 10, 16:
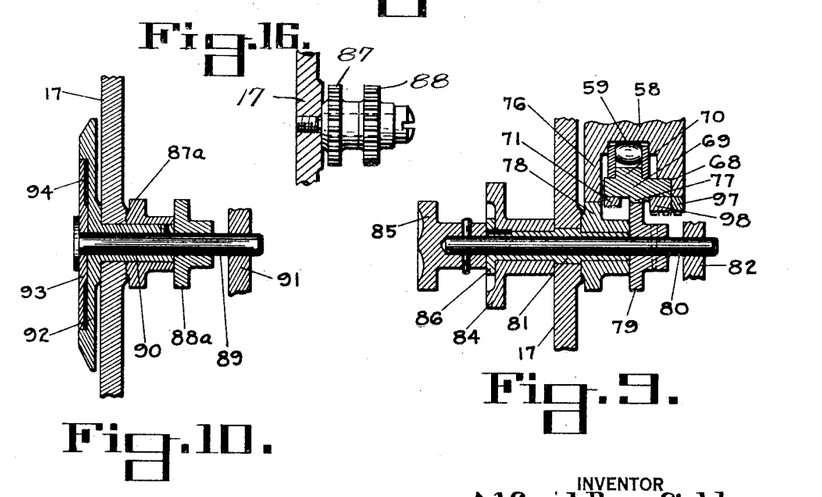
Figure 9 is a fragmentary view in cross section on the line 9—9 of Fig. 2, showing the first and second auxiliary operating gears and their control knobs.
Figure 10 is a fragmentary view in cross section on the line 10—10 of Fig. 2, showing the fractional indicating dials and their operating gears.
Figure 16 is a detail view, partly in section, showing the driving gears of the auxiliary poises.

In order to provide means for readily operating and adjusting the first and second auxiliary poises 58 and 69 a toothed rack 76 is provided on the lower side of the first auxiliary poise 58 and a similar toothed rack 77 is positioned on the lower side of the second auxiliary poise 69. Just below the auxiliary poises 58 and 69 are disposed two gears 78 and 79 mounted on a transversely disposed shaft 80, having its outer portion journaled in an elongated tubular sleeve 81, extending through and rotatably mounted in the front plate of the front section 17, and its inner end journaled in a boss 82 in the base portion 83 of the back section 18. The gear 78 is adapted to mesh with the toothed rack 76 of the first auxiliary poise 58 and is fixedly secured to the elongated sleeve 81, the outer end of which is provided with an operating knob 84 mounted on the front plate of the main poise. The gear 79 is aligned and fastened on the shaft 80 back of the gear 78 and it meshes with the toothed rack 77 of the second auxiliary poise 69, the outer end of the shaft 80 being provided with an operating knob 85 disposed beyond and concentrically with the operating knob 84, engaging an annular flange 86 on the end of the sleeve 81 which fits in a recess in the operating knob 84, thereby bringing the first and second auxiliary poise operating controls in close and readily adjustable relation to each other.

The indicating control mechanism consists of two spaced driving gears 87 and 88, mounted below the auxiliary poises 58 and 69 and meshing with the toothed racks 76 and 77 of the first and second auxiliary poises respectively. Adjacent to the driving gears 87 and 88 and co-operating therewith are located two dial operating gears 87a and 88a, aligned on a shaft 89, the outer end of which is journaled in a sleeve 90 extending through the front plate of the front section 17, in which it is adapted to rotate freely, while the inner end of the shaft 89 is journaled in a boss 91 located in the base portion 83 of the back section 18. The dial operating gear 87a meshes with the driving gear 87 co-operating with the toothed rack 76 of the first auxiliary poise 58 and is fastened to the sleeve 90, which extends from and is integral with an indicating dial 92, mounted on the front plate of the main poise and provided with a series of radially disposed graduations beginning with zero and denoting units of weight of 100 pounds each, ranging from 100 pounds to 900 pounds. The dial operating gear 88a is positioned and fastened on the shaft 89 in alignment with the dial operating gear 87a and meshes with the driving gear 89 co-operating with the toothed rack 77 of the second auxiliary poise 69, the shaft 89 having mounted on its outer end an indicating dial 93 recessed on its under side, so as to facilitate its rotation, and superimposed on the indicating dial 92 in a recess 94 therein, in which the dial 93 is adapted to freely rotate, being provided with a series of radially disposed graduations beginning with zero and denoting units of weight of 5 pounds each from 5 to 95 pounds.

Located beside the dial 92 is a pointed indicator 95, which co-operates and registers with the graduations on the dials 92 and 93. By this arrangement the rotating dials 92 and 93 are constantly maintained in closely correlated positions with respect to each other and thus rendered readily readable. The indicating dials 92 and 93 through the co-opertion of the dial operating gears 87a and 88a with the driving gears 87 and 88, which in turn mesh with the toothed racks 76 and 77, are adapted to be rotated in synchronism with the first and second auxiliary poises 58 and 69 respectively, as the auxiliary poises are moved, their graduations corresponding in number and consecutive arrangement and resistering accurately with the notches of the respective toothed racks 65 and 71, whereby the weight of the load within the range of hundreds of pounds and five-pound fractions thereof will be clearly visible and automatically indicated on the dials 92 and 93.

Mounted on the lower edge of the beam and aligned with its front side is a longitudinal type bar 96 spaced from the toothed rack 14 and provided with a series of type numerals in units denoting 1000 pounds each and registering with the corresponding graduations on the scale plate 16 on the face of the beam above and also with the notches 15 of the toothed rack 14. A longitudinal type bar 97 is secured to the lower side of the first auxiliary poise 58 and is provided with a series of type numerals in units of 1 to 9 and registering with the corresponding notches on the toothed racks 76. A similar longitudinal type bar 98 is attached to the lower side of the second auxiliary poise 69 and also has thereon a series of type numerals in units of 5 to 95 and registering with the corresponding notches on the toothed rack 71, with which it thus co-operates. As will be noted by referring to Fig. 3 of the drawings the type bars 96, 97 and 98 are aligned closely together and are simultaneously and automatically brought successively into operative position and grouped, as the main poise 13 and auxiliary poises 58 and 69 are moved, at the recording station so as to record at the same time the total weight of the load being weighed in thousands, hundreds and five-pound fractions thereof.

Located below the recording station and the type bars 96, 97 and 98 is an elongated platen 99, provided with a transversely disposed ticket stop 100, and adapted to extend along the particular row of type numerals of the type bars 96, 97 and 98 into position at the recording station.

The platen 99 is fixedly mounted on a rectangular plunger 101 and co-operates with the type numerals in impressing the total weight by a single impression on a ticket inserted in a ticket guideway 102 mounted in the front section 17 and aligned with the platen 99 and the type numerals. The plunger 101 is slidably positioned in an opening 103 in the center portion 104 of the base portion 83, passing through a vertical guideway 105 and an opening 106 in the base portion 83, below which it extends and is held in position by an inner stay 107 and a transverse plate 108 attached to the outer side of the center portion 104. An expanded spiral spring 109 surrounding the plunger 101 is located in an opening 110 in the center portion 104, its upper end engaging the lower edge of the plate 108 and its lower end engaging a pin 111 inserted in the plunger 101, the spiral spring 109 being thus adapted to retract the platen 99 after its operation.

Centrally connected to the under side of the base portion 83 is a fixed handle 112, which co-operates with a movable handle 113 pivotally mounted on the under side of the base portion 83 and provided with an arm 114 having an adjusting screw 115 and being adapted to engage the lower end of the plunger 101, which passes through an opening 116 in the attaching plate 117 of the fixed handle 112. The adjusting screw 115 governs the limit of movement of the arm 114 and the plunger 101, thereby permitting the proper adjustment of the pressure exerted by the platen 99 upon the ticket and type numerals and thus protecting the type numerals from injury. When the movable handle 113 is gripped and drawn toward the fixed handle 112 the arm 114 will cause the plunger 101 and hence the platen 99 to be pushed upward to the printing position. The upward movement of the plunger 101 causes the platen 99 to elevate the ticket resting on it and press it sufficiently against the type numerals to impress on the ticket by a single impression the total weight as given by the aligned numerals and after printing, upon releasing the movable handle 113, the platen 99 will be returned to its inoperative position by the action of the spiral spring 109.

Figure 15:
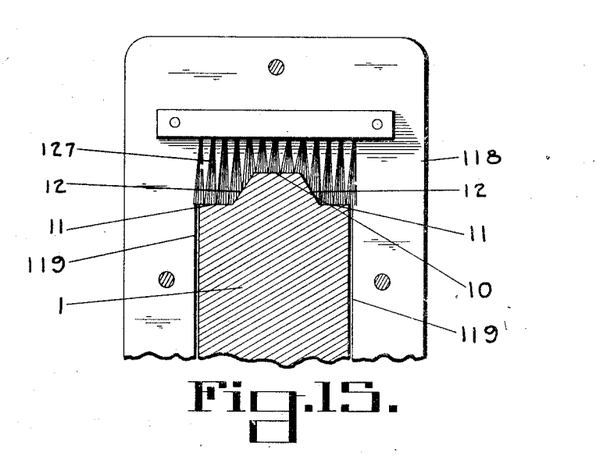
Figure 15 is a fragmentary view, partly in cross section, of the back of the dust guard, showing the brush carried by the guard in its co-operative position on the upper edge of the beam.

In order to protect the poise mechanism from dust, the end walls of the main poise are provided with dust guards 118, each having an opening 119 following the contour of the beam, and a hinged dust cover or guard 120 is mounted over the slotted opening 121 of the ticket guideway 102 attached to the front plate of the main poise by a flange plate 122. The dust guard 120 is provided with a knob 123, a depending flange 124 along its sides, engaging and co-operating with the flange plate 122 in excluding dust from the ticket guideway 102, while a flat spring 125 co-operates with a lug 126 in holding the dust cover 119 securely in its raised and closed positions. To further protect the mechanism from dust poise brushes 127 are transversely disposed in the upper end of the dust guards 118, above the beam and enclosed in recesses 128 in the side walls of the back section 18, having their bristles shaped to conform to the contour of the beam rail 10, its grooved tracks 11 and beveled sides 12, the brushes being adapted to sweep along the beam and thus remove dust therefrom and keep the rail 10 and tracks 11 clean. Thus effective dust protective means is provided for fully protecting the interior mechanism of the main poise as well as the beam rail and tracks.

In operation, when the beam has been properly balanced, the operator pushes down the handle 37 so as to release the multiple-toothed pawl 30 from engagement with the toothed rack 14 on the lower edge of the beam. With the pawl 30 thus freed from engagement with the rack 14 the main poise 13 is moved by the operator along the beam freely and evenly until the point is reached where an approximate balance is obtained, when the handle 37 is raised to its normal or locking position and the pawl 30 is then pressed by the action of the spiral springs 34 into positive engagement with the toothed rack 14 and thus locks the main poise 13 in position and accurate relative alignment on the beam with the particular graduation on the scale plate 16 indicating the weight of the load being weighed in thousands of pounds.

In order to readily obtain the fractional weight the operator turns the first auxiliary poise knob 84, thereby turning the gear 78 meshing with the toothed rack 76 and causing the first auxiliary poise 58 to move to its proper balancing position for obtaining the weight in hundreds of pounds. The second auxiliary poise knob 85 is then turned, which movement turns the gear 79 meshing with the toothed rack 77 and moving the second auxiliary poise 69 to its proper balancing position to obtain the weight in five-pound fractions. As the first auxiliary poise 58 and second auxiliary poise 69 move to their proper balancing positions the spring actuated rollers 64 and 73 follow the toothed racks 65 and 71 respectively until the proper balancing positions are reached, when the rollers 64 and 73 engage the notches 66 and 72 in the toothed racks 65 and 71 respectively and thus lock the auxiliary poises in those particular positions.

As the first and second auxiliary poises 58 and 69 move to their balancing positions, the toothed racks 76 and 77 engage the driving gears 87 and 88 respectively, which turn the dial operating gears 87a and 88a, thereby causing the indicating dials 92 and 93 co-operating therewith to rotate in synchronism with the driving gears 87 and 88 and the auxiliary poises 58 and 69, whereby the graduations on the indicating dials 92 and 93 will register with and correspond to the positions of the rollers 64 and 73 in the notches 66 and 72 of the toothed racks 65 and 71 respectively. Therefore, the rotating dials 92 and 93 in their closely associated and visible positions and co-operating with the indicator 95 enable the operator to quickly and accurately determine the fractional weight of the load in hundreds of pounds and five-pound fractions.

The adjustment of the main poise 13 and the auxiliary poises 58 and 69 bring the proper type numerals of the type bars 96, 97 and 98 of the weigh beam 1 and auxiliary poises 58 and 69 respectively, indicating the total weight, into alignment at the recording station as shown in Fig. 3. To obtain a record of the total weight a suitable ticket is inserted in the ticket slot 121 and pushed through the ticket guideway 102 and over the platen 99 until it engages the ticket stop 100, when the ticket will be supported on the platen 99 and will be in proper position below the aligned type numerals for recording the weight of the load. The fixed handle 112 and movable handle 113 are then gripped by the operator and the movable handle drawn toward the fixed handle, the pressure on the movable handle 113 causing the arm 114 to move upwardly and engage the lower end of the plunger 101 and thus push upwardly the plunger 101, thereby causing the platen 99 to press the ticket firmly against the type numerals and impress or print the total weight thereon. Upon releasing the movable handle 113 the platen 99 and plunger 101 are automatically returned to their inoperative positions by the action of the spiral spring 109 and the main poise 13 may then be moved to the proper position on the beam for balancing the beam preparatory to another weighing.

It is, therefore, evident that important advantages are presented in the efficient and compact mechanism employed, such as the even suspension of the main poise from the beam with minimized friction in its travel along the beam, the means for readily adjusting and operating the auxiliary poises entirely within the casing, also the indicating dials co-operating with the auxiliary poises and automatically rotating in synchronism therewith, the effective dust protective means for the beam and casing, together with simple means for adjusting and locking the main and auxiliary poises in their balancing positions and recording means co-operating with the aligned type numerals carried by the beam and auxiliary poises, whereby the total weight is impressed and recorded on the ticket by a single impression.

While I have shown and described a preferred embodiment of my invention I do not desire to be limited to the exact details thereof, as it is to be understood that various modifications and changes may be made in the construction that will come within the scope of the invention.

I claim:

1. A weigh beam having a rail formed on its upper edge comprising spaced, beveled sides, a flat upper surface and flat laterally extending tracks or guide ways at the base thereof, a main poise provided with rollers adapted to travel on the said rail and tracks, and means for suspending the main poise at three points of suspension from the said rail.

2. A weigh beam having a longitudinal rail formed on its upper edge comprising spaced, inclined sides, a flat upper surface and flat laterally extending tracks or guide ways at the base thereof, a main poise provided with rollers mounted on the said rail and tracks, means for suspending the main poise at three points of suspension from the said rail, a scale plate on the said beam, and a toothed rack on the lower edge of the said beam provided with graduation notches registering with similar graduations on the said scale plate.

3. A weighing device comprising a weigh beam having a rail formed on its upper edge provided with beveled sides, flat laterally extending tracks or runways below said sides, and a main poise slidably mounted on the said beam and suspended therefrom by rollers, one of which moves in its travel on the top of the rail and the other rides clear of the rail and with its spaced rolls traveling on the said tracks, whereby the main poise is held by three-point suspension on the beam and even distribution of the weight of the main poise on the beam is thereby provided constantly under varying conditions of wear and use.

4. A weighing device comprising a weigh beam having a longitudinal rail formed on its upper edge with beveled sides, flat laterally extending tracks below said sides, a main poise slidably mounted on the beam and suspended therefrom by transversely disposed rollers, one of the said rollers being provided with a center hub and spaced rolls having their inner edges beveled, the center hub being adapted to travel on top of the rail and the beveled rolls in contact with the beveled sides of the rail, the other roller being provided with a center shaft connecting relatively large, spaced rolls having V-shaped peripheries, each comprising an outwardly beveled portion and an inwardly beveled portion converging at the junction of the said track and the beveled side of the rail, the said center shaft traveling clear of the rail while the outwardly beveled portion travels at the said converging point in engagement with the said track and the inwardly beveled portion travels in engagement with the said beveled side of the rail, whereby the main poise is permitted to move freely and evenly along the beam and is maintained against lateral play along its entire length.

5. A weighing device comprising a weigh beam, a main poise slidably mounted on the beam, means for locking the main poise in position on the beam comprising a multiple-toothed pawl pivotally mounted below the beam and co-operating with a toothed rack on the said beam, means for operating and unlocking the said pawl from engagement with the said toothed rack, resilient means for holding and locking the said pawl in co-operative engagement with the said toothed rack and for actuating the said pawl to return to locking engagement with the toothed rack after its operation and unlocking, and means for adjusting and regulating the tension of the said resilient means.

6. A weighing device comprising a weigh beam, a main poise slidably mounted on the beam, means for locking the main poise in position on the beam comprising a multiple-toothed pawl pivotally mounted on a slidable guide plate and co-operating with a toothed rack on the said beam, means for operating the said guide plate and pawl and unlocking the pawl from engagement with the said toothed rack, resilient means for holding and locking the said pawl in co-operative engagement with the said toothed rack as well as for returning the said pawl to locking engagement with the toothed rack after its operation and unlocking, and means for regulating the tension of the said resilient means.

7. A weighing device comprising a weigh beam, a main poise slidably mounted on the beam, means for locking the main poise in position on the beam comprising a multiple-toothed pawl pivotally mounted below the beam and co-operating with a toothed rack thereon, means for operating and unlocking the said pawl from engagement with the said toothed rack, resilient means for holding and locking the said pawl in co-operative engagement with the said toothed rack and for actuating the said pawl to return to locking engagement with the toothed rack after its operation and unlocking, and resilient means for automatically returning the said operating means to its inoperative position.

8. A weighing device comprising a weigh beam having a toothed rack on the lower edge thereof, a main poise slidably mounted on the beam, a multiple-toothed pawl pivotally connected to a guide plate slidably mounted in guideways on the inner side of the said main poise, spiral springs located below opposite ends of the said pawl and adapted to normally press and hold the said pawl in co-operative engagement with the said toothed rack, a handle pivotally mounted on the upper side of the main poise and pivotally connected to a vertical rod having its lower end engaging the upper end of the said guide plate, the rod and handle being held in their raised or inoperative positions by an expanded spiral spring surrounding the said rod, the said spiral spring being adapted to return the said handle after operation to its raised or inoperative position.

9. A weighing device comprising a main poise, a longitudinally extending bracket mounted within the casing of the main poise, and a longitudinal frame or bridge attached to the said bracket and provided with a spaced rail portion.

10. A weighing device comprising a main poise, a longitudinally disposed bracket within the casing of the main poise, the said bracket being provided with a main portion having on one side laterally extending, spaced, boss portions and on the other side similarly spaced elongated, laterally extending boss portions, and a longitudinal frame or bridge mounted in the said bracket and comprising a rail portion having spaced rails and upwardly extending arms secured to the ends of the said bracket.

11. A weighing device comprising a weigh beam, a main poise slidably mounted on the beam, a bracket disposed within the said main poise, a first auxiliary poise slidably mounted in the said bracket and adjustable with relation to the said main poise, and a second auxiliary poise slidably disposed in the said bracket in the under side of the first auxiliary poise and adjustable with relation thereto.

12. A weighing device comprising a weigh beam, a main poise slidably mounted on the beam, a bracket disposed within the said main poise, a first auxiliary poise slidably mounted in the said bracket and adjustable with relation to the said main poise, means for adjusting the limit of travel of the first auxiliary poise, and a second auxiliary poise slidably disposed in the said bracket in the under side of the first auxiliary poise and adjustable with relation thereto.

13. A weighing device comprising a weigh beam, a main poise slidably mounted on the beam, a bracket disposed within the said main poise and provided with a rail portion or bridge having spaced rails, a first auxiliary poise slidably mounted on the said rails, a toothed rack on the upper side of the first auxiliary poise, a second auxiliary poise slidably disposed in the under side of the first auxiliary poise and having a portion adapted to slide between the spaced rails of the said bridge, a toothed rack on the under side of the second auxiliary poise, means for moving and adjusting the said first and second auxiliary poises to their balancing positions, and means co-operating with the said toothed racks for locking the said first and second auxiliary poises in their balancing positions.

14. A weighing device comprising a weigh beam, a main poise slidably mounted on the beam, a bracket disposed within the said main poise and provided with a rail portion or bridge having spaced rails and spaced rollers mounted therebetween, a first auxiliary poise slidably mounted on the rollers carried by the said rails, a toothed rack on the upper side of the first auxiliary poise, a second auxiliary poise slidably disposed in the under side of the first auxiliary poise and having a portion adapted to slide between the spaced rails of the said bridge, a toothed rack on the under side of the second auxiliary poise, means for moving and adjusting the said first and second auxiliary poises to their balancing positions, and means co-operating with the said toothed racks for locking the said first and second auxiliary poises in their balancing positions.

15. A weighing device comprising a weigh beam, a main poise slidably mounted on the beam, a bracket disposed within the said main poise and provided with a bridge, a first auxiliary poise slidably mounted on the said bridge and adjustable with relation to the said main poise, means for locking the first auxiliary poise in its balancing position, a second auxiliary poise slidably disposed in the under side of the first auxiliary poise and adjustable with relation thereto, and means for locking the second auxiliary poise in its balancing position.

16. A weighing device comprising a weigh beam, a main poise slidably mounted on the beam, a bracket disposed within the said main poise and provided with a bridge, a first auxiliary poise slidably mounted on the said bridge and adjustable with relation to the said main poise, a toothed rack attached to the upper side of the first auxiliary poise and adapted to co-operate with a spring actuated roller carried by the said bracket for locking the first auxiliary poise in its balancing position, a second auxiliary poise slidably disposed in the under side of the first auxiliary poise and adjustable with relation thereto, a toothed rack secured to the under side of the second auxiliary poise and co-operating with a spring actuated roller mounted below the second auxiliary poise for locking the second auxiliary poise in its balancing position, and means for moving and adjusting the said first and second auxiliary poises to their balancing positions.

17. A weighing device comprising a weigh beam, a main poise slidably mounted on the beam, a bracket disposed within the said main poise and provided with a rail portion or bridge, a first auxiliary poise slidably mounted on the said bridge, a toothed rack on the under side of the first auxiliary poise, a second auxiliary poise slidably disposed in the under side of the first auxiliary poise and the said bridge, a toothed rack on the under side of the second auxiliary poise, and means co-operating with the said toothed racks of the first and second auxiliary poises for moving and adjusting the said poises to their balancing positions.

18. A weighing device comprising a weigh beam, a main poise slidably mounted on the beam, a bracket disposed within the said main poise and provided with a rail portion or bridge, a first auxiliary poise slidably mounted on the said bridge, a toothed rack on the under side of the first auxiliary poise, a second auxiliary poise slidably disposed in the under side of the first auxiliary poise and the said bridge, a toothed rack on the under side of the second auxiliary poise, and two operating gears aligned and disposed on a shaft below the said auxiliary poises, one of the said gears meshing with the toothed rack of the first auxiliary poise and the other gear with the toothed rack of the second auxiliary poise.

19. A weighing device comprising a weigh beam, a main poise slidably mounted on the beam, a bracket disposed within the said main poise and provided with a rail portion or bridge, a first auxiliary poise slidably mounted on the said bridge, a toothed rack on the under side of the first auxiliary poise, a second auxiliary poise slidably disposed in the under side of the first auxiliary poise and the said bridge, a toothed rack on the under side of the second auxiliary poise, an operating gear fastened on a shaft transversely disposed below the said auxiliary poises and meshing with the teeth of the toothed rack of the second auxiliary poise, an elongated tubular sleeve rotatably mounted on the outer portion of the said shaft and having fastened thereon an operating gear meshing with the teeth of the toothed rack of the first auxiliary poise, an operating knob mounted on the outer end of the said shaft for operating the said gear co-operating with the second auxiliary poise, and an operating knob mounted on the outer end of the said sleeve for operating the gear co-operating with the first auxiliary poise, the said operating knobs being thus concentrically disposed and in readily adjustable relation to each other.

20. A weighing device comprising a weigh beam, a main poise slidably mounted on the beam, a bracket disposed within the said main poise and provided with a rail portion or bridge, a first auxiliary poise slidably mounted on the said bridge, a toothed rack on the under side of the first auxiliary poise, a second auxiliary poise slidably disposed in the under side of the first auxiliary poise and the said bridge, a toothed rack on the under side of the second auxiliary poise, and means co-operating with the said toothed racks for controlling and rotating weight indicating means in synchronism with the movement of the said auxiliary poises.

21. A weighing device comprising a weigh beam, a main poise slidably mounted on the beam, a bracket disposed within the said main poise and provided with a rail portion or bridge, a first auxiliary poise slidably mounted on the said bridge, a toothed rack on the under side of the first auxiliary poise, a second auxiliary poise slidably disposed in the under side of the first auxiliary poise and the said bridge, a toothed rack on the under side of the second auxiliary poise, spaced driving gears located below the said auxiliary poises and meshing respectively with the toothed racks of the first and second auxiliary poises, a dial operating gear fastened on a transversely disposed shaft located adjacent to the said driving gears and meshing with the driving gear co-operating with the second auxiliary poise, an elongated sleeve rotatably mounted on the outer portion of the said shaft and having fastened thereon a dial operating gear meshing with the driving gear co-operating with the first auxiliary poise, an indicating dial for the first auxiliary poise provided with radially disposed graduations and mounted on the outer end of the said sleeve, and an indicating dial for the second auxiliary poise provided with radially disposed graduations, mounted on the outer end of the said shaft and superimposed on the said indicating dial of the first auxiliary poise, the said indicating dials being rotated by the said dial operating gears in synchronism with the movement of the said auxiliary poises.

22. A weighing device comprising a weigh beam, a main poise slidably mounted on the beam, a first auxiliary poise slidably mounted within the said main poise, notched means carried by the first auxiliary poise and co-operating with resilient means for locking the first auxiliary poise in its balancing position, a second auxiliary poise slidably disposed below the first auxiliary poise, notched means carried by the second auxiliary poise and co-operating with resilient means for locking the second auxiliary poise in its balancing position, a toothed rack on each of the said auxiliary poises, spaced driving gears meshing respectively with the toothed racks of the first and second auxiliary poises, a dial operating gear for each of the said auxiliary poises and meshing with the driving gear co-operating with the respective auxiliary poise, an indicating dial for each auxiliary poise operatively connected with its respective auxiliary poise, each dial being provided with radially disposed graduations and the second auxiliary dial being superimposed on the first auxiliary dial, the said indicating dials being rotated by the dial operating gears in synchronism with the movement of the said auxiliary poises and the said respective notches of the notched means, carried by the first and second auxiliary poises, registering with corresponding graduations on the said dials of the first and second auxiliary poises respectively.

23. A weighing device comprising a weigh beam, a main poise slidably mounted on the beam, a first auxiliary poise slidably mounted within the said main poise, notched means carried by the first auxiliary poise and co-operating with resilient means for locking the first auxiliary poise in its balancing position, a second auxiliary poise slidably disposed below the first auxiliary poise, notched means carried by the second auxiliary poise and co-operating with resilient means for locking the second auxiliary poise in its balancing position, a toothed rack on each of the said auxiliary poises, a dial operating gear for each of the said auxiliary poises and meshing with a driving gear co-operating with the respective auxiliary poise, an indicating dial for each auxiliary poise operatively connected with its respective auxiliary poise, each dial being provided with radially disposed graduations and the second auxiliary dial being superimposed on the first auxiliary dial, an indicator positioned beside the indicating dial of the first auxiliary poise and registering with the graduations on the said indicating dials, the said indicating dials being rotated by the dial operating gears in synchronism with the movement of the said auxiliary poises and the said respective notches of the notched means, carried by the first and second auxiliary poises, registering with the corresponding graduations on the said dials of the first and second auxiliary poises respectively.

24. A weighing device comprising a weigh beam, a main poise slidably mounted on the beam, a bracket disposed within the said main poise and provided with a rail portion or bridge, a first auxiliary poise slidably mounted on the said bridge, a toothed rack attached to the upper side of the first auxiliary poise, its notches co-operating with resilient means carried by the said bracket for locking the first auxiliary poise in its balancing position, a toothed rack on the under side of the first auxiliary poise, a second auxiliary poise slidably disposed in the under side of the first auxiliary poise and the said bridge, a toothed rack secured to the under side of the second auxiliary poise, its notches co-operating with resilient means mounted below the second auxiliary poise for locking the second auxiliary poise in its balancing position, a dial operating gear disposed on a transverse shaft below the said auxiliary poises and meshing with a driving gear co-operating with the second auxiliary poise, an elongated tubular sleeve rotatably mounted on the outer portion of the said shaft and having fastened thereon a dial operating gear meshing with the teeth of a driving gear co-operating with the first auxiliary poise, an indicating dial for the first auxiliary poise provided with graduations and mounted on the outer end of the said sleeve, and an indicating dial for the second auxiliary poise provided with graduations, mounted on the outer end of the said shaft and superimposed on the said indicating dial of the first auxiliary poise, the said indicating dials being rotated by the said indicating control gears in synchronism with the movement of the said auxiliary poises, while the notches of the said toothed racks of the first and second auxiliary poises in their locked balancing positions register with corresponding graduations on the indicating dials of the first and second auxiliary poises respectively.

25. A weighing device comprising a weigh beam, a main poise slidably mounted on the beam, a first auxiliary poise slidably mounted within the main poise, a second auxiliary poise slidably disposed under the first auxiliary poise, means for sliding and adjusting the said first and second auxiliary poises to their balancing positions, resilient means for locking the said auxiliary poises in their respective balancing positions, a scale plate mounted on the face of the beam and provided with a series of graduations, a type bar on the lower edge of the beam provided with a series of type numerals registering with the said graduations on the scale plate, means for locking the main poise in its balancing position on the beam and in registering position with the said graduations on the scale plate, a type bar on the under side of each auxiliary poise provided with a series of type numerals registering with its respective co-operating locking means at the particular balancing position of the auxiliary poise, means for simultaneously moving the said auxiliary poises to their respective balancing positions and bringing their type numerals successively into aligned and grouped position for recording, and printing means adapted to press a ticket inserted therebelow against the said aligned type numerals and impress the said type numerals thereon, whereby the total weight of a load may be printed by a single impression.

26. A weighing device comprising a weigh beam, a main poise slidably mounted on the beam. a first auxiliary poise slidably mounted within the main poise, a second auxiliary poise slidably disposed under the first auxiliary poise, means for sliding and adusting the said first and second auxiliary poises to their balancing positions, resilient means for locking the said auxiliary poises in their respective balancing positions, concentrically disposed indicating dials provided with graduations, each dial being adapted to rotate in synchronism with the movement of its co-operating auxiliary poise and its graduations registering with the said resilient locking means, a scale plate mounted on the face of the beam and provided with a series of graduations, a type bar on the lower edge of the beam provided with a series of type numerals registering with the said graduations on the scale plate, means for locking the main poise in its balancing position on the beam and in registering position with the said graduations on the scale plate, a type bar on the under side of each auxiliary poise provided with a series of type numerals registering with its respective co-operating locking means at the particular balancing position of the auxiliary poise, means for simultaneously moving the said auxiliary poises to their respective balancing positions and bringing their type numerals successively into aligned and grouped position for recording, and printing means adapted to press a ticket inserted therebelow against the said aligned type numerals and impress the said type numerals thereon, whereby the total weight of a load may be printed by a single impression.

27. A weighing device comprising a weigh beam, a longitudinal scale plate mounted on the face of the beam and provided with a series of graduations, a toothed rack on the lower edge of the said beam, its notches registering with the said graduations of the scale plate, a type bar on the lower edge of the said beam provided with a series of type numerals registering with the said graduations on the scale plate and with the notches of the said toothed rack, a main poise slidably mounted on the beam and provided with a resilient toothed pawl adapted to engage the toothed rack and lock the main poise in its balancing position on the beam, the pawl thereby registering with the particular graduation on the scale plate and the proper type numeral on the type bar, a first auxiliary poise slidably mounted within the main poise and provided with a toothed rack co-operating with resilient means for locking the first auxiliary poise in its balancing position, a longitudinal type bar on the underside of the said first auxiliary poise provided with a series of type numerals registering with the notches of the said toothed rack, a second auxiliary poise slidably disposed below the first auxiliary poise and provided with a toothed rack co-operating with resilient means for locking the second auxiliary poise in its balancing position, a longitudinal type bar on the under side of the said second auxiliary poise provided with a series of type numerals registering with the notches of the said toothed rack, means for moving the said auxiliary poises to their respective balancing positions and simultaneously bringing their type numerals successively into aligned and grouped position for recording, and printing means adapted to press a ticket inserted therebelow against the said aligned type numerals and impress the said type numerals thereon, whereby the total weight of a load may be printed by a single impression.

28. A weighing device comprising a weigh beam, a longitudinal scale plate mounted on the face of the beam and provided with a series of graduations, a toothed rack on the lower edge of the said beam, its notches registering with the said graduations of the scale plate, a type bar on the lower edge of the said beam provided with a series of type numerals registering with the said graduations on the scale plate and with the notches of the said toothed rack, a main poise slidably mounted on the beam and provided with a resilient toothed pawl adapted to engage the toothed rack and lock the main poise in its balancing position on the beam, the pawl thereby registering with the particular graduation on the scale plate and the proper type numeral on the type bar, a first auxiliary poise slidably mounted within the main poise and provided with a toothed rack co-operating with resilient means for locking the first auxiliary poise in its balancing position, a longitudinal type bar on the under side of the said first auxiliary poise provided with a series of type numerals registering with the notches of the said toothed rack, a second auxiliary poise slidably disposed below the first auxiliary poise and provided with a toothed rack co-operating with resilient means for locking the second auxiliary poise in its balancing position, a longitudinal type bar on the under side of the said second auxiliary poise provided with a series of type numerals registering with the notches of the said toothed rack, indicating dials having graduations thereon and adapted to rotate in synchronism with the movement of the said auxiliary poises and their graduations adapted to register with the notches of the said toothed racks, means for moving the said auxiliary poises to their respective balancing positions and simultaneously bringing their type numerals successively into aligned and grouped position for recording, and printing means adapted to press a ticket inserted therebelow against the said aligned type numerals and impress the said type numerals thereon, whereby the total weight of a load may be printed by a single impression.

29. A weighing device comprising a weigh beam, a longitudinal scale plate mounted on the face of the beam and provided with a series of graduations, a toothed rack on the lower edge of the said beam, its notches registering with the said graduations of the scale plate, a type bar on the lower edge of the said beam provided with a series of type numerals registering with the said graduations on the scale plate and with the notches of the said toothed rack, a main poise slidably mounted on the beam and provided with a resilient toothed pawl adapted to engage the toothed rack and lock the main poise in its balancing position on the beam, the pawl thereby registering with the particular graduation on the scale plate and the proper type numeral on the type bar, a first auxiliary poise slidably mounted within the main poise and provided with a toothed rack co-operating with resilient means for locking the first auxiliary poise in its balancing position, a longitudinal type bar on the under side of the said first auxiliary poise provided with a series of type numerals registering with the notches of the said toothed rack, a second auxiliary poise slidably disposed below the first auxiliary poise and provided with a toothed rack co-operating with resilient means for locking the second auxiliary poise in its balancing position, a longitudinal type bar on the under side of the said second auxiliary poise provided with a series of type numerals registering with the notches of the said toothed rack, means for moving the said auxiliary poises to their respective balancing positions and simultaneously bringing their type numerals successively into aligned and grouped position for recording, a platen slidably mounted below the aligned type numerals, means for actuating the platen and causing it to press a ticket placed thereupon against the said aligned and grouped type numerals and impress the said type numerals thereon, and resilient means for retracting the platen to its inoperative position after its operation, whereby the total weight of a load may be printed by a single impression.

30. A weighing device comprising a weigh beam, a longitudinal scale plate mounted on the face of the beam and provided with a series of graduations, a toothed rack on the lower edge of the said beam, its notches registering with the said graduations of the scale plate, a type bar on the lower edge of the said beam provided with a series of type numerals registering with the said graduations on the scale plate and with the notches of the said toothed rack, a main poise slidably mounted on the beam and provided with a resilient toothed pawl adapted to engage the toothed rack and lock the main poise in its balancing position on the beam, the pawl thereby registering with the particular graduation on the scale plate and the proper type numeral on the type bar, a first auxiliary poise slidably mounted within the main poise and provided with a toothed rack co-operating with resilient means for locking the first auxiliary poise in its balancing position, a longitudinal type bar on the under side of the said first auxiliary poise provided with a series of type numerals registering with the notches of the said toothed rack, a second auxiliary poise slidably disposed below the first auxiliary poise and provided with a toothed rack co-operating with resilient means for locking the second auxiliary poise in its balancing position, a longitudinal type bar on the under side of the said second auxiliary poise provided with a series of type numerals registering with the notches of the said toothed rack, means for moving the said auxiliary poises to their respective balancing positions and simultaneously bringing their type numerals successively into aligned and grouped position for recording, a platen slidably mounted on a plunger below the aligned type numerals, the plunger sliding in a guideway and maintaining the platen thereby in alignment with the said type numerals, a fixed handle attached to the under side of the casing of the main poise and positioned below and in alignment with the said plunger and platen, a movable handle pivotally mounted, provided with a retracting spring and co-operating with the said fixed handle, an arm on the said movable handle engaging the lower end of the plunger and adapted, when the said handles are gripped and the movable handle pressed, to push the platen upward and press a ticket placed thereupon against the said aligned and grouped type numerals and impress the said type numerals thereon, and resilient means for retracting the platen to its inoperative position after its operation, whereby the total weight of a load may be printed by a single impression.

31. A weighing device comprising a weigh beam, a longitudinal scale plate mounted on the face of the beam and provided with a series of graduations, a toothed rack on the lower edge of the said beam, its notches registering with the said graduations of the scale plate, a type bar on the lower edge of the said beam provided with a series of type numerals registering with the said graduations on the scale plate and with the notches of the said toothed rack, a main poise slidably mounted on the beam and provided with a resilient toothed pawl adapted to engage the toothed rack and lock the main poise in its balancing position on the beam, the pawl thereby registering with the particular graduation on the scale plate and the proper type numeral on the type bar, a first auxiliary poise slidably mounted within the main poise and provided with a toothed rack co-operating with resilient means for locking the first auxiliary poise in its balancing position, a longitudinal type bar on the under side of the said first auxiliary poise provided with a series of type numerals registering with the notches of the said toothed rack, a second auxiliary poise slidably disposed below the first auxiliary poise and provided with a toothed rack co-operating with resilient means for locking the second auxiliary poise in its balancing position, a longitudinal type bar on the under side of the said second auxiliary poise provided with a series of type numerals registering with the notches of the said toothed rack, means for moving the said auxiliary poises to their respective balancing positions and simultaneously bringing their type numerals successively into aligned and grouped position for recording, a platen slidably mounted below the aligned type numerals, a ticket guideway mounted in the front plate of the main poise and in alignment with the said platen, which is provided with a ticket stop at its inner end, means for actuating the platen and causing it to press a ticket placed thereupon against the said aligned and grouped type numerals and impress the said type numerals thereon, and resilient means for retracting the platen to its inoperative position after its operation, whereby the total weight of a load may be printed by a single impression.

32. A weigh beam carrying transversely disposed means for removing dust from the edge thereof.

33. A weigh beam having a poise movable thereon and provided with means under control of the said movable poise for automatically removing dust from the edge thereof.

34. A weigh beam, a main poise slidably mounted on the said beam, and means carried by the main poise for removing dust from the edge of the said beam.

35. A weigh beam, a main poise slidably mounted on the said beam, and dust removing means carried by the main poise and conforming to the contour of the edge of the beam.

36. A weigh beam, a main poise slidably mounted on the beam, and brushes mounted in the ends of the main poise and adapted to sweep the entire upper edge of the said beam as the main poise moves along the beam and thereby keep the upper edge thereof clean and free from dust.

37. A weigh beam, a main poise slidably mounted on the beam, and transversely disposed brushes mounted in the ends of the main poise, shaped to conform to the contour of the edge of the beam and adapted to sweep the entire upper edge of the said beam as the main poise moves along the beam and thereby keep the upper edge thereof clean and free from dust.

38. A weigh beam, a main poise slidably mounted on the beam, a ticket guideway provided with a slotted opening and mounted in the front plate of the main poise, and a dust cover or guard for the slotted opening of the said ticket guideway.

39. A weigh beam, a main poise slidably mounted on the beam, and dust excluding and protecting means disposed on the end walls of the main poise and co-operating with the said beam.

40. A weigh beam, a main poise slidably mounted on the beam, and a dust excluding guard attached to each of the end walls of the main poise and provided with an opening, the edges of which are adapted to follow and conform to the contour of the said beam.

41. A weigh beam, a main poise slidably mounted on the beam, a ticket guideway provided with a slotted opening and mounted by a flange plate in the front plate of the main poise, a hinged dust cover or guard for the slotted opening of the said ticket guideway provided with a depending flange along its sides and adapted to engage and co-operate with the said flange plate in excluding dust from the ticket guideway, and a lug extending upwardly from the said dust cover and provided with a rounded nose portion adapted to engage and co-operate with a flat spring in holding securely the said dust cover in its raised and closed positions.

In testimony whereof I have signed my name to this specification.

ALFRED BOUSFIELD.